United States Patent [19]
Cornillault et al.

[11] 3,807,864
[45] Apr. 30, 1974

[54] DEVICE FOR DETERMINING A GRANULOMETRY CURVE OF PARTICLE MIXTURE

[75] Inventors: Jean Cornillault, Nozay; Francois Joly, Pithiviers, both of France

[73] Assignee: Compagnie Industrielle Des Lasers, Marcoussis, France

[22] Filed: Aug. 25, 1972

[21] Appl. No.: 283,899

[30] Foreign Application Priority Data
Aug. 25, 1971 France .............................. 71.30802

[52] U.S. Cl. .............. 356/102, 250/237 R, 356/201
[51] Int. Cl. ...................... G01n 15/02, G01n 21/24
[58] Field of Search .......... 356/102, 103, 201, 207, 356/208; 250/229, 237 R

[56] References Cited
UNITED STATES PATENTS
2,862,415  12/1958  Kuljian ........................... 250/237 X
3,504,183  3/1970  Salkowski et al. .............. 250/237 X

*Primary Examiner*—Ronald L. Wibert
*Assistant Examiner*—F. L. Evans
*Attorney, Agent, or Firm*—Sughrue, Rothwell, Mion, Zinn & Macpeak

[57] ABSTRACT

A device for determining a granulometry curve of a particle mixture, comprising a monochromatic light source illuminating a sample of the mixture, an optical system forming an image of the diffraction spot created by the illuminated mixture and several diaphragms disposed in succession between the image and a photosensitive receiver, the openings of these diaphragms having a tangential and a radial dimension with respect to the circles of the diffraction image, these two dimensions being proportional to the mean distance from the opening to the centre of the image.

7 Claims, 9 Drawing Figures

DEVICE FOR DETERMINING A GRANULOMETRY CURVE OF PARTICLE MIXTURE

BACKGROUND OF THE INVENTION

1. Field of the Invention

The present invention relates to devices for determining a granulometry curve of a particle mixture.

2. Prior Art

A device for determining a granulometry curve of a particle mixture is known. Said device comprises:

a monochromatic light beam generator illuminating a sample of the particle mixture in suspension in a fluid having a closed circulation, an optical system forming in its focal plane an actual image of the diffraction spot created by the illuminated sample, a system for scanning said image comprising a first fixed diaphragm disposed in said focal plane, provided with an opening in the form of a circular sector centred on the centre of said image, a second mobile diaphragm disposed parallel to the first diaphragm, the opening of said second diaphragm being a slit substantially perpendicular to the axis of said sector, means for displacing the second diaphragm parallel to itself opposite said sector and a photosensitive detector, the active surface of which is disposed opposite the opening of said second diaphragm and a system for processing the electric signals issued by said detector.

It has been established that the known device cited above does not allow satisfactory results to be obtained in a simple manner. In fact, when the edge of the image is being scanned where the density of the luminous energy is very low it is necessary to add up several successive measurements.

SUMMARY OF THE INVENTION

The object of the present invention is to obviate this disadvantage. The present invention relates to a device for determining a granulometry curve of a particle mixture. This device comprises:

a monochromatic light source, a container allowing a sample of the mixture to be kept on the path of a parallel beam emitted by the source, an optical system forming in its focal plane an image of the diffraction spot of the mixture illuminated by the source, a system for scanning the image, comprising:

a plurality of diaphragms disposed in succession in the focal plane, a light receiver, the photosensitive surface of which is disposed on the path of the light flow issuing from the image and being transmitted by each of the diaphragms and a system for processing the electric signals emitted by the receiver receiving said light flow. The device is characterized in that the section of the opening of the diaphragms has, with respect to the circles of diffraction of the image, a tangential and a radial dimension. The tangential dimension is proportional to the average distance from the opening to the centre of the image and the radial dimension is linked with the average distance by an increasing linear law.

Further details of the present invention will be given in the following description with reference to the accompanying drawings provided by way of non-limitative examples. In the drawings:

DESCRIPTION OF THE PREFERRED EMBODIMENTS

Figure 1:
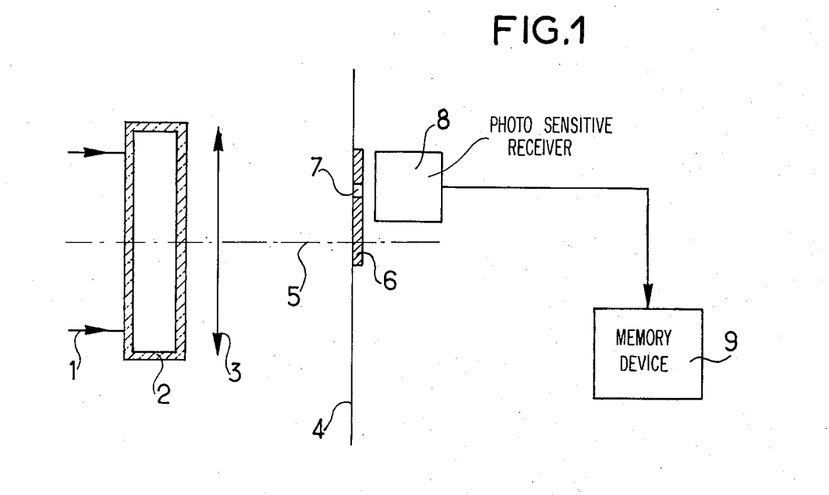
FIG. 1 is a general diagram of an embodiment of the device according to the invention.

FIG. 1 is a diagrammatic representation of an embodiment of a device according to the invention. This device permits the determination of a granulometry curve of a mixture of particles of the same nature, comparable to spheres or discs. The device comprises a monochromatic light beam 1, emitted by a source such as a laser generator illuminating a sample of particles, preferably suspended in a liquid or a gas. This sample is disposed in a transparent container 2, which is advantageously connected to a device (not shown) permitting the continuous circulation of the particles. An optical system, for example a lens 3, forms in its focal plane an image of the diffraction spot created by the illuminated sample. This image is centred on the axis 5 of the optical system. A diaphragm 6 provided with an opening 7 is disposed in the focal plane 4. The device according to the invention comprises n diaphragms similar to the diaphragm 6 for scanning the diffraction image. The shape and position of the openings in the diaphragms $n$ with respect to the axis of the optical system, will be described below. The opening 7 of the diaphragm 6 limits the useful area of the photosensitive surface of a receiver 8, the outputs of which are connected to a device 9. This device 9 may comprise, for example:

an electronic memory to record $n$ values of the electric signal issued by the receiver 8 in proportion to the light flow Fk illuminating the useful photosensitive surface of the receiver 8, the length of the wave $\lambda$ of the source, the focal distance $f$ of the optical system and the values $d_{1k}$ and $d_{2k}$ of the distance from the centre of the diffraction image to the closest and the most distant edges respectively of the useful photosensitive surface for each of the positions of this surface ($k$ assumes the whole values from 1 to $n$ successively), an electronic calculating device connected to the electronic memory and capable of calculating from data recorded in said memory and from the display of a sequence of diameter values of the particles $a_i$ forming a geometric progression, selected in advance from the possible diameter values of the particles in the mixture, $i$ being a number taking the values 1 to $n$ successively, the values $N_i$ being solutions of the system of equations, $$F_k = \text{constant} \sum_{i=1}^{i=n} N_i \frac{a_i^2}{2\sigma^2} \int_{a=0}^{a=\infty} \exp.$$

$$-\left[\frac{[\log a - \log a_i^2]^2 \sigma}{2\sigma^2}\right]^2 \times \left[J_o^2\left[\frac{ad_{1k}}{z}\right] + J_1^2\left[\frac{ad_{1k}}{z}\right]\right.$$

$$\left. - J_o^2\left[\frac{ad_{2k}}{z}\right] - J_1^2\left[\frac{ad_{2k}}{z}\right]\right] d(\log a)$$

$J_o$ and $J_1$ being Bessel functions of the order 0 and 1, $N_i$ being a representative value of the amount of particles of the diameter $a_i$ contained in the mixture in question, $o$ being equal to $(\log r)\sqrt{2 \log 2}$, $r$ being the reason of the geometric progression of the values $a_i$, $z$ being equal to $\lambda f/\pi$, a calculation circuit connected to the electronic calculating device, comprising:

means for calculating the values $N_i a_i^2$ and the values of $[\log a_i]$, means for calculating the equations of the gaussian curves the peaks of which have the calculated values $[\log a_i]$ and $N_i a_i^2$ as coordinates and the span of which, defined by the coefficient $\sigma$ is such that two gaussian curves having the same height and corresponding to two similar values $(\log [a_i]$ intersect each other half way up and means for calculating the curve which is the sum of the gaussian curves and a tracer device connected to the calculation circuit permitting the sum of the curve to be indicated visually.

Figure 2:
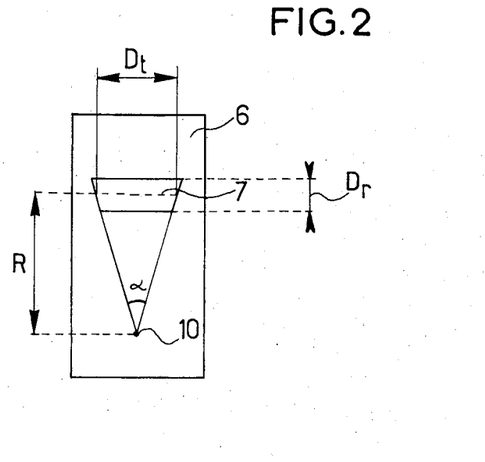
FIG. 2 is a plan view of part of the device shown in FIG. 1.

FIG. 2 is a plan view of the diaphragm shown in section in FIG. 1. The opening in this diaphragm is in the form of an isoceles trapeze, the peak of the isoceles triangle associated with this trapeze being disposed on the optical axis 5 of the device according to FIG. 1. The mean distance R from the opening 7 to the point 10, the mean tangential dimension $D_t$ of this opening and its radial dimension $D_r$ are shown in FIG. 2. The terms tangential' and 'radial' are used with respect to the circles of the diffraction image. With regard to the n diaphragms referred to previously, $D_t$ is proportional to R (which amounts to saying that the angle at the top of the isoceles triangle is constant) and $D_r$ is also linked to R by a linear law.

Figure 3:
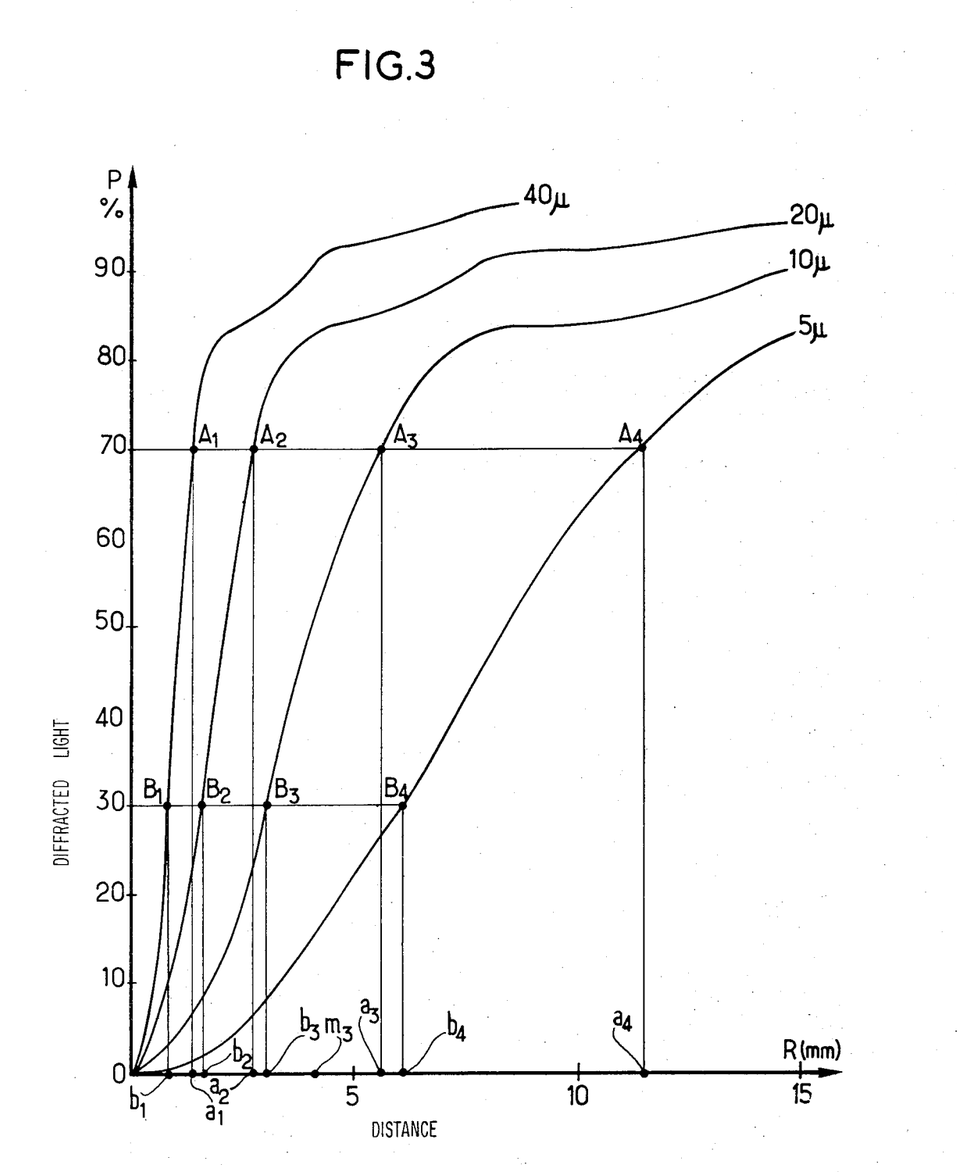
FIG. 3 is a system of curves representing, for a sample of monodispersed particles, the distribution of light energy in the image of the diffraction spot associated with this sample, for different diameter values of the particles.

Advantageously the law $D_r = f[R]$ is determined in the following way: in a system of axes of rectangular coordinates OR,OP, a network of curves giving the variation in the percentage P of the light energy diffracted in a diffraction circle is traced as a function of the value R of the radius of this circle expressed in millimeters with the diameter of the particles as a parameter. Each curve corresponds to a unit of monodispersed particles, i.e., a unit composed exclusively of particles having the same diameter. FIG. 3 represents, for example, four curves $P = f[R]$ corresponding respectively to the diameters 40,20,10 and 5 microns. These curves, traced for a focal distance of 120 mm from the optical system forming the diffraction image, were determined from theoretical considerations. On each of these curves a substantially linear part is defined between two straight lines parallel to the R axis. The respective ordinates are, for example, equal to 70 percent and 30 percent as shown in FIG. 3. The 70 percent ordinate intersects the curves at the points $A_1$, $A_2$, $A_3$ and $A_4$ respectively and the 30 percent ordinate at the points $B_1$, $B_2$, $B_3$ and $B_4$. These linear parts $A_1$, $B_1$, $A_2$, $B_2$, $A_3$, $B_3$, and $A_4$, $B_4$ are projected onto the axis R so as to obtain the segments $a_1b_1$, $a_2b_2$, $a_3b_3$ and $a_4b_4$ respectively. $m_3a_3b_3$ are shown.

The segment $a_1b_1$, for example, defines, in the plane of the diffraction image, a zone limited by the circles of $Oa_1$ and $Ob_1$ radius where the diffused light power comes principally from the particles having diameters of 40 microns or close to 40 microns. The segment $a_2 b_2$ relates in the same way to the light diffused by the particles having a diameter of 20 microns and so on.

Figure 4:
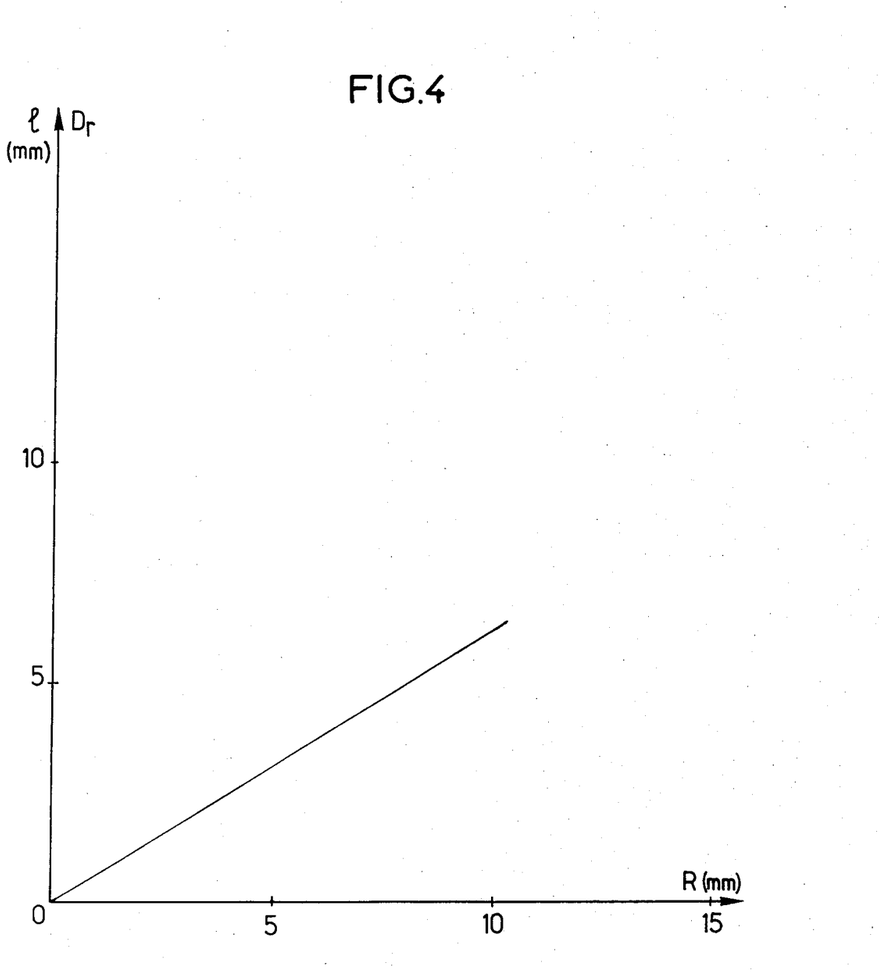
FIG. 4 is a curve representing the variation in a dimension of the opening in the diaphragms of the device shown in FIG. 1, as a function of the distance from this opening to the centre of the image of the diffraction spot.

The curve $1 = f[R]$ of the variation in the length of the segments such as $ab_3$ as a function of the abscissa of their median point such as $m_3$ is traced in FIG. 4. This curve is increasing and linear. As shown in the Figure, the curve $D_r = f[R]$ will advantageously be identical to the curve $1 = f[R]$.

The device described and illustrated in FIGS. 1 and 2 operates in the following way: the diaphragms n are disposed in succession as indicated in FIG. 1. One measure(ment) corresponds to each diaphragm: a light flow Fk illuminates the photosensitive surface of the receiver which transforms this flow into an electric signal transmitted to the processing device 9. This device carries out the operations defined above and displays the value of the percentages of the particles corresponding to a given dimension.

The device described above and shown in FIGS. 1 and 2 necessitates on the one hand, the placing and successive removal of n diaphragms and, on the other hand, the displacement of the receiver for each measuring operation so that its photosensitive surface is disposed opposite to the opening in the diaphragms.

Figure 5:
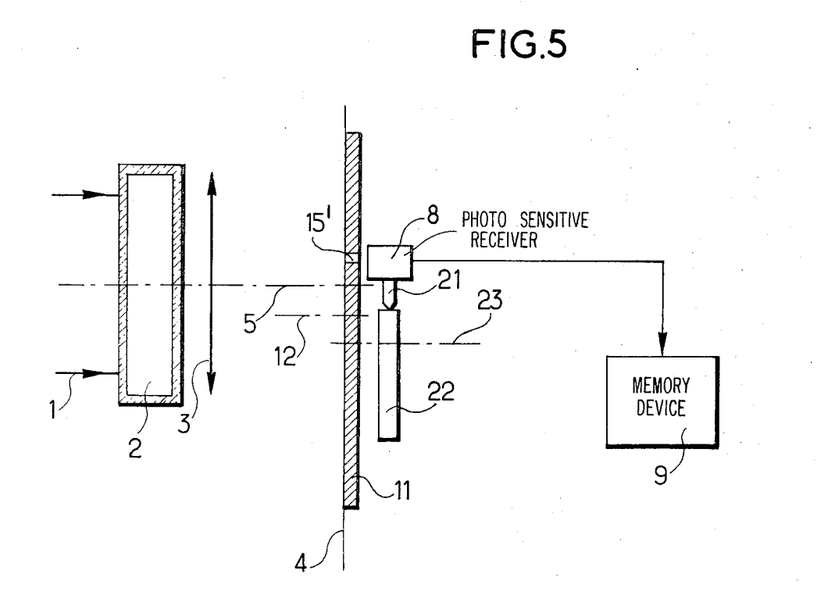
FIG. 5 is a general diagram of a second embodiment of the device according to the invention.

FIG. 5 shows another embodiment of the device according to the invention which permits a diffraction spot of a mixture to be examined, to be analyzed in a simpler and more rapid way. This device comprises a monochromatic light flow 1 illuminating a sample of particles in suspension in a fluid placed in a container 2. An optical system 3 forms in its focal plane 4 an image of the diffraction spot created by the illuminated sample, said image being centred on the axis 5 of the optical system 3. A disc 11, which is represented in cross section and which may be driven in rotation about an axis parallel to the axis 5, is disposed in the plane 4.

Figure 6:
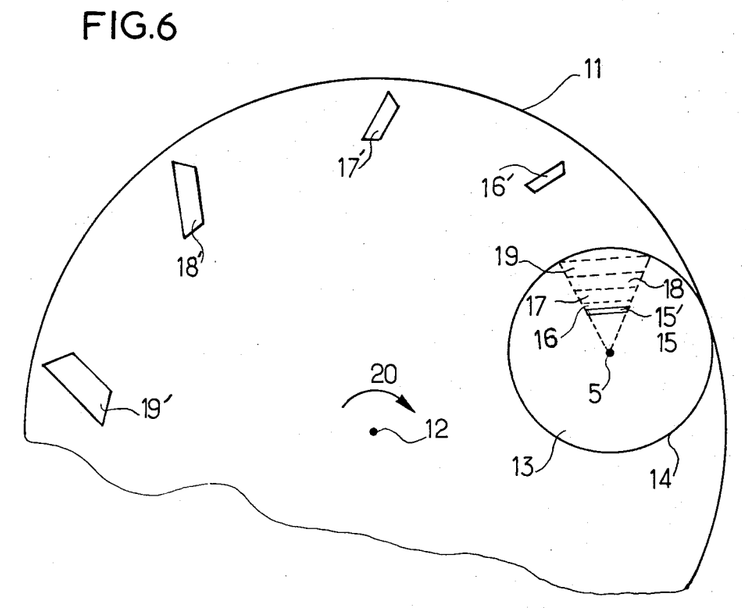
FIG. 6 is a plan view of a part of the device shown in FIG. 5.

FIG. 6 is a plan view of the disc 11, which is capable of rotating about the axis 12. This disc covers the image 13 of the diffraction spot limited by a circle 14 centred at the point 5 which corresponds to the line of the axis 5 of FIG. 5. The isoceles trapezes 15, 16, 17, 18 and 19 are represented by perforated lines in a circular section of the circle 14. The peak of the isoceles triangle associated with these trapezes is the point 5. The dimensions of these trapezes conform to the law defined above in the course of the description of FIG. 2. The disc 11 comprises the openings 15',16'17'18' and 19', the form of which is identical to the trapezes 15,16,17,18 and 19 respectively.

The disposition of these openings on the disc 11 has been selected in such a manner that when the disc 11 is driven in rotation about the axis 12 in the direction of the arrow 20, the openings 15',16', 17',18' and 19' coincide successively with the trapezes 15,16,17 18 and 19 respectively. In the position shown in FIG. 6 the opening 15' coincides with the trapeze 15.

As shown in FIG. 5, the photosensitive surface of a light receiver 8 is disposed opposite the disc 11. This receiver is provided with means for regulating its position with respect to the corresponding opening of the disc 11. To this end, the receiver 8 may comprise a sliding part 21 on a shaft 22 driven in rotation about an axis 23. This rotational movement is synchronized with that of the disc 11. Advantageously, the disc 11 and the shaft 22 may be driven by the same motor, for example, a stepping motor aided by a system of gears (not shown). The electrical outputs of the receiver 8 are connected to a processing device 9.

The device shown in FIG. 5 operates as follows: the disc 11 and and the cam 22 are driven in rotation. At the point when an opening in the disc 11 coincides with a trapeze of the circle 14, the receiver 8 receives a light beam $F_k$. The signals issued by the receiver 8 are processed in the manner described in the course of the description of the device shown in FIG. 1.

Figure 7:
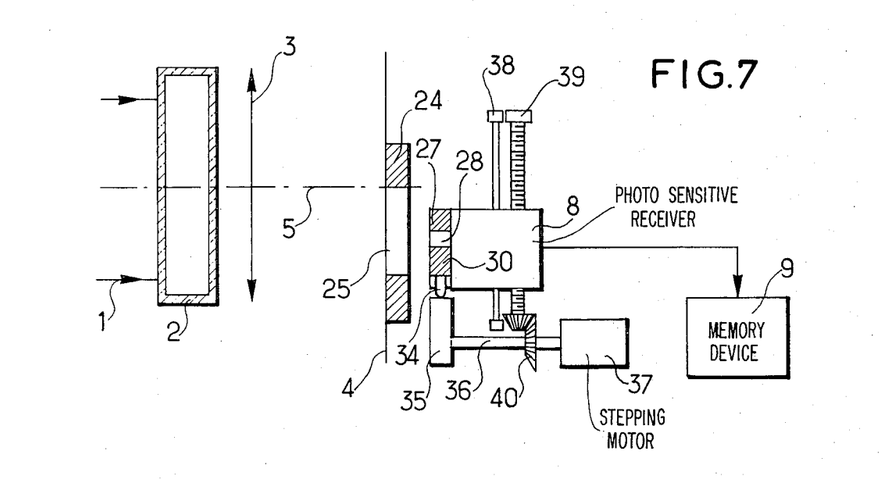
FIG. 7 is a general diagram of a third embodiment of the device according to the invention.
Figure 8:
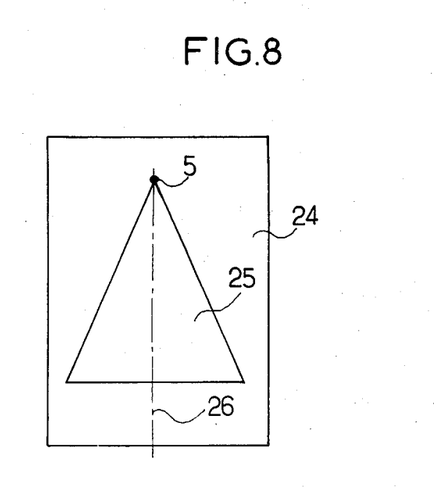
FIG. 8 is a plan view of a part of the device shown in FIG. 7
Figure 9:
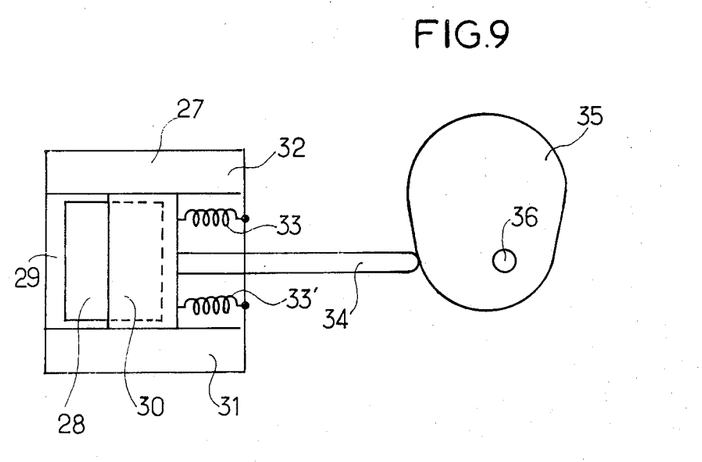
FIG. 9 is a partial view of a scanning device of a diffraction spot; said scanning device forming part of the device shown in FIG. 7.

FIGS 7,8 and 9 show a third embodiment of the device according to the invention. FIG. 7 shows a light beam 1 illuminating a particle mixture contained in a container 2, a lens 3 forming in its focal plane an image of the diffraction spot created by the mixture, said image being centred on the axis 5 of the lens 3. The system for scanning the image comprises a first fixed diaphragm 24 disposed in the plane 4. A sectional view of this is represented in FIG. 7.

FIG. 8 represents a plan view of this diaphragm 24. Its opening 25 is in the form of an isoceles triangle, the peak of which is on the axis 5 of FIG. 7. 26 is the line bissecting the angle at the peak 5 of this isoceles triangle.

The scanning system also comprises a second mobile diaphragm 27, a sectional view of which is shown in FIG. 7. This mobile diaphragm 27 is disposed behind the stationary diaphragm 24 in a plane substantially parallel to the plane 4. This diaphragm 27 has a slit 28, the distance between the edges of which is variable.

FIG. 9 shows a plan view of the mobile diaphragm 27. The slit 28 is limited by an edge 29 integral with the diaphragm 27 and an edge 30 which is mobile with respect to the edge 29. These edges are orthogonal to the line 26 of FIG. 8. The edge 30 is composed of a sliding part in two slides 31 and 32 parallel to the line 26. Two extended springs 33 and 33' maintain the contact between a part 34 integral with the edge 30 and a cam 35 rotating about a shaft 36. The shaft 36 may be driven in rotation by a stepping motor 37 (FIG. 7).

As shown in FIG. 7, a light receiver 8 is disposed behind the mobile diaphragm 27 for detecting the light energy across the diaphragms 24 and 27. This receiver may advantageously be integral with the diaphragm 27 as indicated in the figure.

The scanning device comprises means for displacing the diaphragm 27 parallel to itself in the direction of the line 26 (FIG. 8). These means may, for example, consist, as indicated in FIG. 7, of two fixed pins 38 and 39 parallel to the line 26 (FIG. 8). The pin 38 is for guiding the diaphragm 27 and the pin 39 is an endless screw driven in rotation by the stepping motor 37 aided by a conical gearing device 40.

The gearing device 40 and the shape of the cam 35 are such that when the motor 37 displaces the diaphragm 27 parallel to the line 26 (FIG. 8) the distance between the edges 29 and 30 of the slit 28 varies as a function of the mean distance of these edges to the axis 5 according to an identical law to that defined above in the course of the description of FIG. 2. The association of the diaphragms 24 and 27 is equivalent to a diaphragm in the form of an isoceles trapeze the dimensions and position of which with respect to the axis 5 vary according to the law defined above.

The device shown in FIG. 7 operates as follows: after the motor has been started the receiver 8 receives a light flow $F_k$ at each step of the motor. The receiver 8 transforms this flow into an electric signal. The electric signals issued by the receiver 8 permit a characteristic curve of the granulometry of the system to be obtained with the aid of a processing device 9.

What is claimed is:

1. In a device for determining a granulometry curve of a particle mixture including:

a monochromatic light source emitting a parallel beam, a transparent container for holding a sample of the mixture, means mounting the container on the path of said parallel beam, an optical system receiving the light passing through said container and forming in its focal plane an image of the diffraction spot of the mixture, means for rotating said image symmetrically about a center, and a system for scanning the image, said system comprising:

movable diaphragm means defining opening means and disposed in the focal plane to delimit a movable small portion of said image, a movable light receiver including a photo sensitive surface for measuring the light transmitted through said opening means from said portion of said image, means for keeping the photo sensitive surface of said receiver in the path of said transmitted light, and a system for processing said measurements in terms of electric signals issued by the receiver receiving the light, the improvement wherein:

said diaphragm means include means responsive to increase in the distance of said portion to said center for increasing the tangential and radial dimensions of said portion of said image, whereby:

the variation of the light intensity received by the light receiver is limited and the processing of electrical signals issued by the receiver is easily achieved.

2. The device according to claim 1, wherein: the opening means in the diaphragm means is in the form of an isoceles trapeze, the peak of the isoceles triangle being placed on the axis of the optical system, the average length of the bases of the trapeze being the tangential dimension and the height of the trapeze being the radial dimension.

3. The device according to claim 2, wherein: the diaphragm means and said opening means consist of a first stationary diaphragm disposed in the focal plane and provided with an opening in the form of an isoceles triangle, the peak of which is disposed on the axis of the optical system and a second mobile diaphragm disposed parallel to the first diaphragm, said second diaphragm comprising a slit substantially perpendicular to the bissecting line of the angle at the peak of the isoceles triangle, said slit comprising a first and a second edge, the first edge being integral with the second diaphragm and the distance of the second edge with respect to the first edge being variable, means for displacing the second diaphragm parallel to itself in the direction of the bissecting line and means for varying the distance of second edge of the slit with respect to the first edge.

4. The device according to claim 3, wherein: the light receiver is integral with the second diaphragm.

5. The device according to claim 4, wherein: the means for displacing the second diaphragm comprises: a fixed guide pin, means operatively mounting said second diaphragm on said guide pin for movement along the axis of said fixed guide pin, an endless screw mounted for rotation about its axis, with the axis of said endless screw being parallel to the axis of said fixed guide pin, a stepping motor, gear means coupling said stepping motor to said endless screw for moving said second diaphragm, and wherein said means for varying the distance of the second edge of the slit with respect to the first edge comprises: a mobile part on said second diaphragm defining said second edge and acting as a cam follower, a cam operatively associated with said cam follower for moving the same upon rotation of said cam and means operatively coupling said cam to said stepping motor.

6. The device according to claim 1, wherein: the monochromatic source is a laser generator.

7. The device according to claim 1, wherein diaphragm means include:
a disk with openings disposed in said focal plane and being rotatable about an axis parallel to the axis of said optical system,
driving means for step rotation of said disk to place successively, said openings on portions of said image at different distances from said center, and wherein;
the means for keeping the photo sensitive surface of the light receiver in the path of the light consists of a part integral with the receiver and slidably mounted for movement in response to rotation of a cam in contact with said part, and wherein said cam is mounted for rotation about an axis parallel to the axis of the optical system by said driving means.

* * * * *